(12) United States Patent
Matsumura et al.

(10) Patent No.: US 12,199,461 B2
(45) Date of Patent: Jan. 14, 2025

(54) CONTEXT-BASED BATTERY CHARGING APPARATUS AND METHOD

(71) Applicant: Intel Corporation, Santa Clara, CA (US)

(72) Inventors: Naoki Matsumura, San Jose, CA (US); Tod Schiff, Portland, OR (US); Zhongsheng Wang, Portland, OR (US); Chee Lim Nge, Beaverton, OR (US); Ming-Chia Lee, New Taipai (TW); Ivy Li, Berkeley, CA (US); Brice Onken, Hillsboro, OR (US); Qiyong Brian Bian, Portland, OR (US); John Valavi, Hillsboro, OR (US); Ling-shun Wong, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 17/338,488

(22) Filed: Jun. 3, 2021

(65) Prior Publication Data

US 2022/0224135 A1 Jul. 14, 2022

Related U.S. Application Data

(60) Provisional application No. 63/135,343, filed on Jan. 8, 2021.

(51) Int. Cl.
*H02J 7/00* (2006.01)
*G06F 1/26* (2006.01)
*G06F 1/3212* (2019.01)
*G06N 3/08* (2023.01)
*G06N 3/04* (2023.01)
*G06N 20/00* (2019.01)

(52) U.S. Cl.
CPC .............. *H02J 7/0048* (2020.01); *G06F 1/26* (2013.01); *G06N 3/08* (2013.01); *H02J 7/0042* (2013.01); *H02J 7/0071* (2020.01); *G06F 1/3212* (2013.01); *G06N 3/04* (2013.01); *G06N 20/00* (2019.01); *H02J 7/00032* (2020.01)

(58) Field of Classification Search
CPC ...... H02J 7/0048; H02J 7/0042; H02J 7/0071; G06N 3/08; G06N 20/00; G06F 1/26
USPC ......................................... 320/107, 117, 134
See application file for complete search history.

(56) References Cited

U.S. PATENT DOCUMENTS

| | | | | |
|---|---|---|---|---|
| 6,011,380 A | * | 1/2000 | Paryani | B60L 58/27 320/132 |
| 7,024,321 B1 | * | 4/2006 | Deninger | H02J 7/005 320/113 |
| 7,253,586 B2 | * | 8/2007 | Kangas | H02J 7/0071 320/124 |

(Continued)

FOREIGN PATENT DOCUMENTS

| | | | | |
|---|---|---|---|---|
| CN | 114977343 A | * | 8/2022 | ............ H02J 7/0047 |
| JP | 2016178740 A | * | 10/2016 | ............ H01M 10/44 |
| WO | WO-2011011755 A2 | * | 1/2011 | ............ H02J 5/005 |

*Primary Examiner* — John T Trischler
(74) *Attorney, Agent, or Firm* — Schwabe, Williamson & Wyatt, P.C.

(57) ABSTRACT

Software and/or hardware to monitor system usage including how long system ran on a battery or with AC adapter power. The software and/or hardware judges whether fast charging is needed and/or how much charge is needed, and optimizes battery charging settings.

20 Claims, 6 Drawing Sheets

(56) References Cited

U.S. PATENT DOCUMENTS

| | | | |
|---|---|---|---|
| 7,402,978 B2* | 7/2008 | Pryor | B60L 53/62 320/104 |
| 7,852,045 B2* | 12/2010 | Matsumura | H02J 7/02 320/155 |
| 8,164,468 B2* | 4/2012 | Gofman | H02J 7/007192 340/603 |
| 8,232,774 B2* | 7/2012 | Matsumura | H02J 5/00 320/155 |
| 8,441,363 B2* | 5/2013 | Gofman | H02J 7/007194 340/603 |
| 8,497,686 B2* | 7/2013 | Hoshino | G01R 31/392 320/132 |
| 8,581,554 B2* | 11/2013 | Saligram | H02J 7/04 320/132 |
| 8,589,097 B2* | 11/2013 | Kirchev | G01R 31/392 702/108 |
| 8,854,002 B2* | 10/2014 | Rich | H02J 7/00 320/152 |
| 8,922,329 B2* | 12/2014 | Davis | H02J 50/90 340/5.1 |
| 8,996,324 B2* | 3/2015 | Majima | H01M 10/425 324/426 |
| 9,000,730 B2* | 4/2015 | Murawaka | B60L 53/64 320/132 |
| 9,041,356 B2 | 5/2015 | Matsumura et al. | |
| 9,130,392 B2* | 9/2015 | Chen | G06F 1/263 |
| 9,263,908 B2* | 2/2016 | Ju | H01M 10/42 |
| 9,312,720 B2* | 4/2016 | Gofman | H02J 7/007192 |
| 9,391,466 B2* | 7/2016 | Wang | H02J 7/0048 |
| 9,442,548 B1* | 9/2016 | Johansson | G06F 1/3234 |
| 9,450,426 B2* | 9/2016 | Moorhead | H02J 7/00 |
| 9,533,594 B2* | 1/2017 | Nakasone | B60L 53/65 |
| 9,667,078 B2* | 5/2017 | Gofman | H02J 7/007194 |
| 9,685,810 B1* | 6/2017 | Bhardwaj | H02J 7/0048 |
| 9,853,476 B2* | 12/2017 | Lee | H02J 7/00047 |
| 9,893,542 B2* | 2/2018 | Hwang | H02J 7/0049 |
| 9,923,401 B2* | 3/2018 | Jung | H02J 7/00 |
| 10,050,458 B2* | 8/2018 | Gofman | A61B 5/14532 |
| 10,090,567 B2* | 10/2018 | Austin | B60L 53/14 |
| 10,122,205 B2 | 11/2018 | Matsumura et al. | |
| 10,250,052 B2* | 4/2019 | Patil | H02J 7/0071 |
| 10,310,025 B2* | 6/2019 | Soga | H01M 10/48 |
| 10,320,212 B2* | 6/2019 | Gofman | H02J 7/00714 |
| 10,436,846 B2* | 10/2019 | Matsumura | H02J 7/0048 |
| 10,525,834 B2* | 1/2020 | Sakakibara | H02J 7/007182 |
| 10,606,336 B2* | 3/2020 | de la Cropte de Chanterac | G06F 1/329 |
| 10,666,077 B1* | 5/2020 | Dharia | H02J 7/0071 |
| 10,673,271 B2* | 6/2020 | Krishnakumar | G06F 1/26 |
| 10,705,146 B2* | 7/2020 | Otagiri | H01M 10/42 |
| 10,763,681 B2* | 9/2020 | Gofman | H02J 7/007192 |
| 10,782,773 B2* | 9/2020 | de la Cropte de Chanterac | G06F 1/3212 |
| 10,803,385 B2* | 10/2020 | Lee | G06N 3/088 |
| 10,948,973 B2* | 3/2021 | de la Cropte de Chanterac | G06F 1/329 |
| 10,992,155 B2* | 4/2021 | Shih | B60L 53/53 |
| 11,005,278 B2* | 5/2021 | Lai | H02J 7/00712 |
| 11,056,903 B2* | 7/2021 | Lim | H02J 7/00036 |
| 11,063,448 B2* | 7/2021 | Klicpera | H02J 7/005 |
| 11,101,677 B2* | 8/2021 | Shih | G01R 31/396 |
| 11,163,006 B2* | 11/2021 | Coenen | H02J 7/0048 |
| 11,187,754 B2* | 11/2021 | Sugiyama | H02J 7/007184 |
| 11,233,408 B2* | 1/2022 | Lai | B60L 53/80 |
| 11,251,471 B2* | 2/2022 | Austin | B60L 53/63 |
| 11,258,107 B2* | 2/2022 | Austin | B60L 53/38 |
| 11,258,108 B2* | 2/2022 | Austin | B60L 53/305 |
| 11,258,109 B2* | 2/2022 | Austin | B60L 53/126 |
| 11,258,110 B2* | 2/2022 | Austin | H01M 10/44 |
| 11,258,111 B2* | 2/2022 | Austin | B60L 53/305 |
| 11,258,112 B2* | 2/2022 | Austin | B60L 53/63 |
| 11,258,285 B2* | 2/2022 | Shin | H02J 7/00032 |
| 11,264,652 B2* | 3/2022 | Austin | B60L 53/63 |
| 11,271,255 B2* | 3/2022 | Vickery | B60L 58/27 |
| 11,340,678 B2* | 5/2022 | Thompson | G06F 1/263 |
| 11,349,157 B2* | 5/2022 | Austin | H01M 10/44 |
| 11,355,791 B2* | 6/2022 | Austin | B60L 53/18 |
| 11,355,792 B2* | 6/2022 | Austin | B60L 53/38 |
| 11,397,216 B2* | 7/2022 | Ghantous | H02J 7/007182 |
| 11,437,829 B2* | 9/2022 | Shin | H02J 7/00712 |
| 11,482,734 B2* | 10/2022 | Austin | B60L 53/38 |
| 11,482,735 B2* | 10/2022 | Austin | B60L 53/63 |
| 11,482,736 B2* | 10/2022 | Austin | B60L 53/68 |
| 11,489,207 B2* | 11/2022 | Austin | H01M 10/44 |
| 11,489,208 B2* | 11/2022 | Austin | B60L 53/14 |
| 11,502,529 B2* | 11/2022 | Tseng | H02J 7/00714 |
| 11,508,996 B2* | 11/2022 | Austin | B60L 53/305 |
| 11,515,581 B2* | 11/2022 | Austin | B60L 53/18 |
| 11,515,582 B2* | 11/2022 | Austin | B60L 53/38 |
| 11,545,703 B2* | 1/2023 | Huo | G06N 20/00 |
| 11,549,991 B2* | 1/2023 | Lobenstein | H02J 7/345 |
| 11,588,191 B2* | 2/2023 | Austin | B60L 53/63 |
| 11,594,767 B2* | 2/2023 | Austin | B60L 53/305 |
| 11,594,768 B2* | 2/2023 | Austin | B60L 53/18 |
| 11,594,769 B2* | 2/2023 | Austin | B60L 53/14 |
| 11,600,867 B2* | 3/2023 | Austin | B60L 53/18 |
| 11,621,442 B2* | 4/2023 | Austin | B60L 53/68 320/109 |
| 11,621,444 B2* | 4/2023 | Austin | B60L 53/38 320/109 |
| 11,710,861 B2* | 7/2023 | Austin | H01M 10/44 320/109 |
| 11,710,862 B2* | 7/2023 | Austin | B60L 53/126 320/109 |
| 11,721,844 B2* | 8/2023 | Austin | B60L 53/18 320/109 |
| 11,721,845 B2* | 8/2023 | Austin | B60L 53/14 320/109 |
| 11,728,526 B2* | 8/2023 | Austin | B60L 53/63 320/109 |
| 11,750,006 B2* | 9/2023 | Sugino | H02J 7/00302 320/137 |
| 11,862,773 B2* | 1/2024 | Huo | G06N 20/00 |
| 11,884,180 B2* | 1/2024 | Irie | H01M 10/345 |
| 11,888,127 B2* | 1/2024 | Austin | B60L 53/126 |
| 11,901,522 B2* | 2/2024 | Austin | B60L 53/126 |
| 11,901,523 B2* | 2/2024 | Austin | B60L 53/18 |
| 11,909,010 B2* | 2/2024 | Austin | B60L 53/126 |
| 11,909,011 B2* | 2/2024 | Austin | B60L 53/126 |
| 12,015,128 B2* | 6/2024 | Austin | B60L 53/126 |
| 12,015,129 B2* | 6/2024 | Austin | B60L 53/38 |
| 12,081,047 B2* | 9/2024 | Venkatraman | H02J 50/12 |
| 2005/0200332 A1* | 9/2005 | Kangas | H02J 7/0013 320/128 |
| 2007/0075678 A1* | 4/2007 | Ng | H02J 7/007192 320/106 |
| 2008/0007202 A1* | 1/2008 | Pryor | B60L 53/14 320/104 |
| 2008/0315836 A1* | 12/2008 | Matsumura | H02J 7/02 320/134 |
| 2009/0146826 A1* | 6/2009 | Gofman | H02J 7/007192 340/636.2 |
| 2010/0289457 A1* | 11/2010 | Onnerud | H02J 7/00711 320/160 |
| 2011/0006737 A1* | 1/2011 | Saligram | H02J 7/04 320/134 |
| 2011/0018679 A1* | 1/2011 | Davis | H02J 7/04 320/155 |
| 2011/0050239 A1* | 3/2011 | Hoshino | G06Q 30/06 324/435 |
| 2011/0080141 A1* | 4/2011 | Matsumura | H02J 5/00 320/134 |
| 2011/0119005 A1* | 5/2011 | Majima | H01M 10/425 324/426 |
| 2011/0175569 A1* | 7/2011 | Austin | B60L 53/68 320/109 |
| 2012/0081078 A1* | 4/2012 | Matsumura | H02J 7/02 320/149 |
| 2012/0181991 A1* | 7/2012 | Gofman | A61B 5/14532 320/150 |

(56) References Cited

U.S. PATENT DOCUMENTS

| | | | |
|---|---|---|---|
| 2012/0293122 A1* | 11/2012 | Murawaka | B60L 53/64 320/109 |
| 2012/0296586 A1* | 11/2012 | Kirchev | G01R 31/392 702/63 |
| 2013/0099724 A1* | 4/2013 | Rich | H02J 7/00712 320/106 |
| 2013/0257352 A1* | 10/2013 | Gofman | H02J 7/007192 320/150 |
| 2013/0257382 A1* | 10/2013 | Field | H02J 7/0071 320/136 |
| 2013/0341923 A1* | 12/2013 | Ju | H01M 10/42 320/112 |
| 2014/0035514 A1* | 2/2014 | Wang | H04W 52/0248 320/155 |
| 2014/0042986 A1* | 2/2014 | Chen | H02J 7/0031 320/162 |
| 2014/0049222 A1* | 2/2014 | Moorhead | H01M 10/441 320/134 |
| 2015/0061592 A1* | 3/2015 | Nakasone | B60L 53/14 320/109 |
| 2015/0123595 A1* | 5/2015 | Hussain | H02J 7/00712 320/107 |
| 2015/0134282 A1* | 5/2015 | Soga | H01M 10/48 702/63 |
| 2015/0188324 A1* | 7/2015 | Nicholson | H02J 7/007188 320/128 |
| 2016/0003911 A1* | 1/2016 | Lim | G01R 31/392 324/427 |
| 2016/0049821 A1* | 2/2016 | Aridome | H02J 7/0071 320/128 |
| 2016/0064960 A1* | 3/2016 | DiCarlo | H02J 7/007 320/134 |
| 2016/0064961 A1* | 3/2016 | DiCarlo | H02J 7/0048 320/157 |
| 2016/0141893 A1* | 5/2016 | Lee | G06F 1/26 320/134 |
| 2016/0149418 A1* | 5/2016 | Jung | H02J 7/007194 320/152 |
| 2016/0181842 A1* | 6/2016 | Gofman | H02J 7/007192 320/149 |
| 2016/0355098 A1* | 12/2016 | Sakakibara | H02J 7/007182 |
| 2016/0359339 A1* | 12/2016 | Hwang | H02J 7/0049 |
| 2017/0163046 A1* | 6/2017 | Patil | H02J 7/04 |
| 2017/0176538 A1* | 6/2017 | Matsumura | G01R 31/3835 |
| 2017/0179733 A1* | 6/2017 | Matsumura | H02J 7/005 |
| 2017/0256960 A1* | 9/2017 | Shin | H02J 7/00712 |
| 2017/0331309 A1* | 11/2017 | Gofman | H02J 7/007194 |
| 2018/0351214 A1* | 12/2018 | Austin | B60L 53/38 |
| 2018/0351215 A1* | 12/2018 | Austin | B60L 53/126 |
| 2018/0351216 A1* | 12/2018 | Austin | B60L 53/14 |
| 2018/0351217 A1* | 12/2018 | Austin | B60L 53/38 |
| 2018/0351218 A1* | 12/2018 | Austin | B60L 53/38 |
| 2018/0351381 A1* | 12/2018 | Shin | H02J 7/00032 |
| 2018/0358828 A1* | 12/2018 | Gofman | H02J 7/0071 |
| 2018/0364786 A1* | 12/2018 | de la Cropte de Chanterac | G06F 1/329 |
| 2018/0375166 A1* | 12/2018 | Austin | H01M 10/44 |
| 2018/0375167 A1* | 12/2018 | Austin | B60L 53/14 |
| 2018/0375168 A1* | 12/2018 | Austin | B60L 53/38 |
| 2018/0375169 A1* | 12/2018 | Austin | B60L 53/14 |
| 2018/0375170 A1* | 12/2018 | Austin | B60L 53/126 |
| 2018/0375171 A1* | 12/2018 | Austin | H01M 10/44 |
| 2018/0375172 A1* | 12/2018 | Austin | B60L 53/63 |
| 2018/0375173 A1* | 12/2018 | Austin | B60L 53/126 |
| 2018/0375174 A1* | 12/2018 | Austin | B60L 53/14 |
| 2018/0375175 A1* | 12/2018 | Austin | B60L 53/38 |
| 2019/0072618 A1* | 3/2019 | Ghantous | H02J 7/005 |
| 2019/0074708 A1* | 3/2019 | Krishnakumar | H02J 7/0013 |
| 2019/0109483 A1* | 4/2019 | Huo | H02J 7/04 |
| 2019/0148785 A1* | 5/2019 | Austin | B60L 53/38 320/109 |
| 2019/0148786 A1* | 5/2019 | Austin | B60L 53/14 320/109 |
| 2019/0148787 A1* | 5/2019 | Austin | B60L 53/14 320/109 |
| 2019/0148788 A1* | 5/2019 | Austin | B60L 53/68 320/109 |
| 2019/0148789 A1* | 5/2019 | Austin | H01M 10/44 320/109 |
| 2019/0148790 A1* | 5/2019 | Austin | B60L 53/18 320/109 |
| 2019/0148791 A1* | 5/2019 | Austin | B60L 53/18 320/109 |
| 2019/0148792 A1* | 5/2019 | Austin | B60L 53/305 320/109 |
| 2019/0148793 A1* | 5/2019 | Austin | B60L 53/38 320/109 |
| 2019/0148794 A1* | 5/2019 | Austin | H01M 10/44 320/109 |
| 2019/0165431 A1* | 5/2019 | Austin | B60L 53/63 |
| 2019/0207267 A1* | 7/2019 | Vickery | B60L 58/13 |
| 2019/0207268 A1* | 7/2019 | Lai | H01M 10/482 |
| 2019/0207393 A1* | 7/2019 | Shih | G01R 31/382 |
| 2019/0207397 A1* | 7/2019 | Lai | B60L 53/68 |
| 2019/0207398 A1* | 7/2019 | Shih | B60L 53/53 |
| 2019/0229547 A1* | 7/2019 | Lim | H01M 10/44 |
| 2019/0260214 A1* | 8/2019 | Gofman | G01N 33/48785 |
| 2019/0305597 A1* | 10/2019 | Venkatraman | H02J 7/24 |
| 2019/0379212 A1* | 12/2019 | Cho | G06N 3/088 |
| 2019/0383878 A1* | 12/2019 | Coenen | H02J 7/0048 |
| 2020/0011933 A1* | 1/2020 | Otagiri | G01R 31/388 |
| 2020/0074297 A1* | 3/2020 | Lee | G06N 3/042 |
| 2020/0127481 A1* | 4/2020 | Axelsson | B60L 58/12 |
| 2020/0183477 A1* | 6/2020 | de la Cropte de Chanterac | G06F 1/329 |
| 2020/0217901 A1* | 7/2020 | Sugiyama | H02J 7/00036 |
| 2020/0379540 A1* | 12/2020 | de la Cropte de Chanterac | H04W 52/0258 |
| 2020/0395636 A1* | 12/2020 | Austin | H01M 10/44 |
| 2020/0395637 A1* | 12/2020 | Austin | B60L 53/14 |
| 2020/0395638 A1* | 12/2020 | Austin | H01M 10/44 |
| 2021/0036531 A1* | 2/2021 | Tseng | H02J 7/0071 |
| 2021/0083486 A1* | 3/2021 | Klicpera | H01M 10/443 |
| 2021/0091583 A1* | 3/2021 | Kamijima | H01M 10/48 |
| 2021/0126296 A1* | 4/2021 | Austin | B60L 53/18 |
| 2021/0135295 A1* | 5/2021 | Austin | B60L 53/63 |
| 2021/0135296 A1* | 5/2021 | Austin | B60L 53/38 |
| 2021/0152002 A1* | 5/2021 | Sugino | H02J 7/00302 |
| 2021/0184275 A1* | 6/2021 | Austin | B60L 53/68 |
| 2021/0234205 A1* | 7/2021 | Austin | B60L 53/68 |
| 2021/0276451 A1* | 9/2021 | Irie | B60L 53/62 |
| 2021/0336464 A1* | 10/2021 | Fritz | H02J 7/0068 |
| 2022/0082628 A1* | 3/2022 | Lobenstein | G01R 1/203 |
| 2022/0091650 A1* | 3/2022 | Thompson | G06F 1/28 |
| 2022/0200066 A1* | 6/2022 | Austin | B60L 53/68 |
| 2022/0209313 A1* | 6/2022 | Austin | B60L 53/126 |
| 2022/0209314 A1* | 6/2022 | Austin | B60L 53/305 |
| 2022/0209315 A1* | 6/2022 | Austin | B60L 53/14 |
| 2022/0209316 A1* | 6/2022 | Austin | B60L 53/14 |
| 2022/0209317 A1* | 6/2022 | Austin | B60L 53/305 |
| 2022/0209318 A1* | 6/2022 | Austin | B60L 53/305 |
| 2022/0216529 A1* | 7/2022 | Austin | B60L 53/126 |
| 2022/0216530 A1* | 7/2022 | Austin | B60L 53/305 |
| 2022/0216531 A1* | 7/2022 | Austin | B60L 53/18 |
| 2022/0216532 A1* | 7/2022 | Austin | B60L 53/14 |
| 2022/0238928 A1* | 7/2022 | Austin | B60L 53/305 |
| 2022/0238929 A1* | 7/2022 | Austin | B60L 53/63 |
| 2022/0238930 A1* | 7/2022 | Austin | B60L 53/38 |
| 2022/0238931 A1* | 7/2022 | Austin | B60L 53/305 |
| 2022/0246999 A1* | 8/2022 | Austin | B60L 53/38 |
| 2022/0247000 A1* | 8/2022 | Austin | B60L 53/63 |
| 2022/0271557 A1* | 8/2022 | Tseng | H02J 7/0071 |
| 2022/0317199 A1* | 10/2022 | Ghantous | H02J 7/00711 |
| 2022/0407317 A1* | 12/2022 | Matsumura | H02J 7/00714 |
| 2022/0407337 A1* | 12/2022 | Wang | H02J 7/0047 |
| 2023/0012593 A1* | 1/2023 | Austin | B60L 53/38 |
| 2023/0013807 A1* | 1/2023 | Austin | B60L 53/63 |
| 2023/0014364 A1* | 1/2023 | Austin | B60L 53/68 |
| 2023/0014616 A1* | 1/2023 | Liu | H02J 7/0036 |
| 2023/0016705 A1* | 1/2023 | Austin | B60L 53/68 |
| 2023/0020418 A1* | 1/2023 | Austin | B60L 53/126 |

(56) References Cited

U.S. PATENT DOCUMENTS

| | | | |
|---|---|---|---|
| 2023/0170541 A1* | 6/2023 | Austin | B60L 53/14 |
| | | | 320/109 |
| 2023/0198032 A1* | 6/2023 | Huo | H02J 7/0071 |
| | | | 320/137 |
| 2023/0207906 A1* | 6/2023 | Austin | B60L 53/14 |
| | | | 320/109 |
| 2023/0213586 A1* | 7/2023 | Kong | G01R 31/367 |
| | | | 702/63 |
| 2023/0378555 A1* | 11/2023 | Austin | B60L 53/305 |
| 2023/0378556 A1* | 11/2023 | Austin | B60L 53/18 |
| 2023/0387486 A1* | 11/2023 | Austin | B60L 53/68 |
| 2024/0222719 A1* | 7/2024 | Austin | B60L 53/305 |
| 2024/0222720 A1* | 7/2024 | Austin | B60L 53/14 |

* cited by examiner

CONTEXT-BASED BATTERY CHARGING APPARATUS AND METHOD

CLAIM OF PRIORITY

This application is a Non-Provisional of, and claims the benefit of priority to U.S. Provisional Patent Application No. 63/135,343, filed on Jan. 8, 2021, titled "Context-Based Battery Charging Apparatus and Method", and which is incorporated by reference in entirety.

BACKGROUND

Many types of rechargeable batteries degrade over the lifetime of the rechargeable battery. One factor that contributes to the degradation of a battery is maintaining an amount of charge that is a high percentage of the battery's total charge capacity. Many electronic devices, including sensor nodes, solar powered roadway signs, and remote solar powered lighting systems depend on batteries with long life cycles to reduce the need to maintain the device and replace batteries.

Lithium-ion (Li-ion) battery is a popular battery used in many different devices. Battery life and system performance are key desires of users and are influenced by battery State-Of-Health (SOH) and battery impedance. When battery is degraded, battery SOH becomes worse and battery life becomes shorter. Also, system performance becomes worse because battery impedance increases due to degradation and turbo power is limited.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
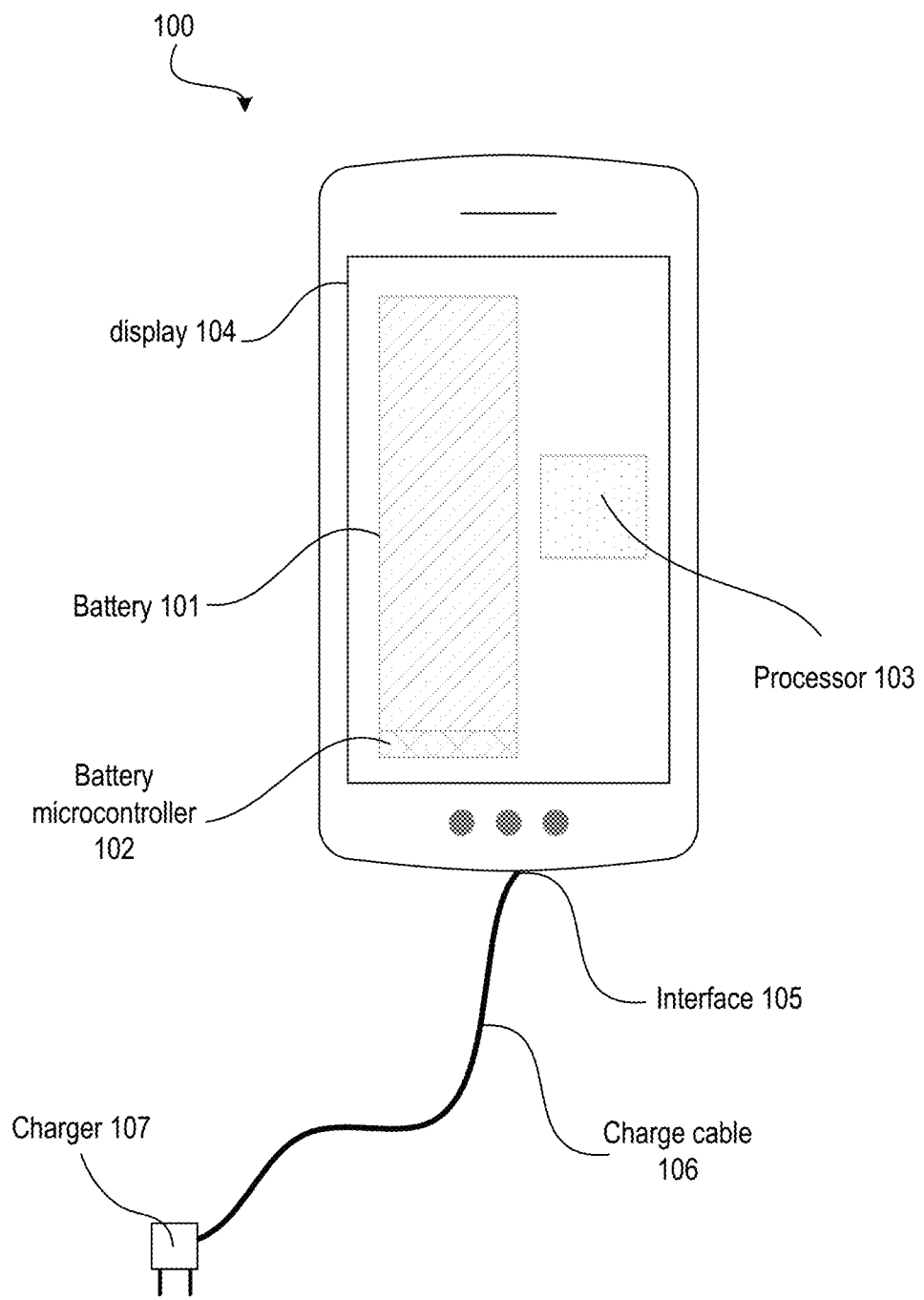
FIG. 1 illustrates a device having a battery and logic for context-based battery charging, in accordance with some embodiments.

Many devices would benefit from extending the life of batteries to reduce maintenance of the device and the cost of replacing a battery. Particularly, devices that are located in remote areas would benefit from a reduction of required maintenance because the time and effort to access the devices may be costly. Additionally, many users of sensor nodes and other similar devices have a plurality of devices, the maintenance of which may be overly burdensome.

Most mobile computing systems have a rechargeable battery (e.g. Li-ion battery) and a charger (e.g. AC adapter, Universal Serial Bus (USB) charger, Thunderbolt® charger, etc.). When a plugged-in system is powered on and the attached battery is charged, a charger needs to supply current or power to both the system and battery. In some situations, end users need fast battery charging. For example, if a user is at an airport terminal and is about to get on an airplane where there may not be an outlet, the user may want to charge the battery as fast as possible before getting on the airplane. To do this, higher current or power needs to be supplied from a charger to the battery if the system and/or battery supports fast battery charging.

For fast charging, users usually have to buy and bring a more powerful but larger and/or heavier charger at extra cost. This is because if a charger does not have sufficient power to support both system power and charging, battery charging may be deprioritized. Additional cost for a charger is not preferable to users. Also, when a powerful charger is always performing fast charging when fast charging is not needed, such fast charging may accelerate battery degradation and decrease longevity of the battery.

Battery degradation is accelerated when a battery is always fast-charged and/or fully-charged. For example, batteries show 50% less longevity with 1 C fast charge vs. normal 0.5 C charge, 25% less longevity with full charge vs. 90% charge, and 33% less turbo power and 18% less battery capacity in case of 1 C fast charge with full charge.

Some embodiments describe an apparatus and method to monitor system usage. Examples of usage include how long a system runs on a battery or with an AC adapter. The apparatus and method then judge whether fast charging is needed and/or how much charge is needed, and optimizes battery charging settings accordingly.

Embodiments and arrangements disclosed herein describe a system including a rechargeable energy storage device, which may be referred to herein as a "battery cell" or "battery." The battery may be electrically coupled to a load or "device" in a manner that permits energy flow from the battery to the device. In some embodiments, the battery is connected to a power source for charging. In some of embodiments, a charge regulator is able to terminate, or reduce the rate of, energy flow from the power source to the battery ("charging"). In some embodiments, a processor sends a command to the charge regulator to terminate, or reduce the rate of, charging. In some embodiments, a rate of discharging is measured or calculated based on an amount of electricity delivered from the battery to the device and the rate of charging may be reduced to a rate that maintains a near-constant level of charge in the battery cell. In some embodiments, the processor accesses data pertaining to one or more environmental conditions ("environmental data") and calculates an amount of charge to power the device for a duration of time at least until a predicted recharge begins ("charge termination value").

In some of these embodiments, the environmental data is gathered by sensors and stored in a data store ("memory"). Some embodiments may also comprise an alarm to communicate that the battery cell is at an insufficient charge level to continue providing electricity to the device until a predicted recharge begins. In some embodiments, an alarm may communicate that, due to one or more factors such as degradation and environmental factors, the battery is no longer capable of storing energy required to reach the charge termination value for one or more predicted durations of time for which the battery will be without charging.

Some embodiments provide a machine-readable storage media having machine-executable instructions that when executed, cause one or more processors to perform a method of context-based charging of the battery. In some embodiments, the method comprises recording a first battery state-of-charge at an end of a first battery discharge and/or at a beginning of a first battery charge after the first battery discharge. In some embodiments, the method comprises recording a first time when battery charging starts or when a battery charger is attached. In some embodiments, the method comprises recording a second time when a second battery discharge starts or a battery charger is detached. In some embodiments, the method comprises recording a second battery state-of-charge when a second battery discharge starts or a battery charger is detached. In some embodiments, the method comprises calculating a minimum state-of-charge or a charging speed, or both based on the first state-of-charge and second state-of-charge and/or difference between the first time and second time, respectively. In some embodiments, the method comprises modifying charging settings to limited charging and/or reduced charging speed based on the minimum state-of-charge and/or difference between the first time and second time.

In some embodiments, the method comprises disabling the limited charging when the first state-of-charge or second state-of-charge is below a threshold. In some embodiments, limited charging and/or reduced charging speed is enabled or disabled by duration and/or pattern of pressing a button, pattern to open/close a lid, pattern to attach/detach a charger, activation or deactivation of enabling or disabling option in software, and/or activation or deactivation of dedicated button and/or sensor. In some embodiments, limited charging and/or reduced charging speed is enabled or disabled as indicated by a light duration, light pattern, and/or light color. In some embodiments, the method comprises applying a machine-learning scheme to determine limits for limited charging and/or reduced charging speed. In some embodiments, the machine-learning scheme includes neural network to predict limits for limited charging and/or reduced charging speed. In some embodiments, the machine-learning scheme involves training a model referred to here as a machine-learning model. Some machine learning models may work well with limited train size and others may work better when larger train size. Various embodiments may include multiple models. Such multiple models may be trained separately and periodically at the same time. Prediction with least error during training can be used. Some embodiments may use Random Forest and/or Support Vector Machine (SVM) to predict unnecessary fast charging.

In some embodiments, a machine-readable storage media having machine-executable instructions that when executed, cause one or more processors to perform a method of context-based battery charging. In some embodiments, the method comprises recording a first battery state-of-charge at an end of a first battery discharge and/or at a beginning of a first battery charge after the first battery discharge, and/or when a battery charger is attached. In some embodiments, the method comprises recording a second battery state-of-charge when a second battery discharge starts or a battery charger is detached. In some embodiments, the method comprises modifying charging settings to limited charging based on the first and/or second battery state-of-charge. In some embodiments, the method comprises calculating a minimum state-of-charge and/or a charging speed based on the first and/or second state-of-charges. In some embodiments, the method comprises modifying a percentage of charge termination to 100 minus the minimum state-of-charge. In some embodiments, the method comprises recording a first time when battery charging starts or when a battery charger is attached, and recording a second time when a battery discharge starts or a battery charger is detached. In some embodiments, the method comprises modifying charging settings of charging speed based on a difference between the first time and second time, the first battery state-of-charge, and/or the second battery state-of-charge.

There are many technical effects of the various embodiments. For example, workload dependent load-sharing mechanism reduces overall battery aging while supporting turbo modes of the state-of-charge. At the same time, the mechanism improves battery efficiency which in turn improves workload battery life in multi-battery systems such as a dual display device. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates device 100 having a battery and logic for context-based battery charging, in accordance with some embodiments. In some embodiments, device 100 comprises battery 101, battery microcontroller 102, processor 103, display 104, and interface 105 for charging cable 106. Charging cable 106 is coupled to charger 107 which is capable of providing fast charge to battery 101. In some embodiments, battery 101 and battery microcontroller 102 are part of a battery unit, where battery 101 comprises a number of battery cells connected together. In some embodiments, battery 101 uses Li-ion technology. In some embodiments, microcontroller 102 includes a fuel gauge and logic for context-based charging. In some embodiments, processor 103 is a system-on-chip as described with reference to FIG. 6.

Referring back to FIG. 1, device 100 includes interface 105 which can be connected to a charging cable 106. Charging cable 106 can be a universal serial bus compliant cable or any other suitable cable. Charging cable 106 is connected to charger 107, which is capable of supplying charge.

Here, the term "fast charging" generally refers to charging a battery pack (one or more battery cells) at greater than or equal to 0.5 C. e. Fast charging may raise the voltage and/or provide higher amount of current than/for the battery pack. For example, fast charging may increase voltage up to 5 V, 9 V, 12 V, and higher such that amperage increases to 3 Amperes or more. Here, the term "normal" charging generally refers to charging a battery pack at less than 0.5 C. In some embodiments, fast charging may be constant current charging, constant voltage charging, pulse charging and/or combination of these charging schemes.

In some embodiments, a logic of device 100 such as microcontroller 102 and/or processor 103 applies a situational or context-based charging algorithm that detects user's situation and judges if fast battery charging is needed, and if so, enables fast charging. In some embodiments, the logic monitor system usage, especially how long system ran on a battery or with an AC adapter, and judges whether fast charging is needed and/or how much charge is needed, and optimizes battery charging settings.

To detect if user is in a situation which needs fast charging, microcontroller 102 and/or processor 103 analyzes one or more parameters. For example, microcontroller 102 and/or processor 103 analyzes user's location (e.g. station, airport, cruise ship, coffee shop, restaurant, gas station, campground, etc.) to determine whether fast charging is needed. The one or more parameters may also include user's near-future schedule (e.g., travel, departure, meeting, any events that need battery power, etc.). Microcontroller 102 and/or processor 103 may also analyze user's usage model (e.g., requirement of Wi-Fi/modem, requirement of numbers of processor cores, workload, type of applications being run, etc.) and remaining battery capacity.

For example, if user is at an airport (location) working on documents on a laptop with internet connection and is about to depart, such as in 30 minutes, (near-future schedule) but battery fuel gauge shows 10% (remaining battery capacity), then microcontroller 102 and/or processor 103 detects that and concludes that the user needs fast charging. Once the need for fast charging is detected, microcontroller 102 and/or processor 103 determines whether charger 107 can provide enough power to support both system and battery fast charging. If charger 107 cannot sustain fast charging to support both the system and battery fast charging, microcontroller 102 and/or processor 103 turns down system power (e.g. reduce display brightness) and starts fast charging with available charger power to a sufficient charge level (e.g., 60%). In some embodiments, when microcontroller 102 and/or processor 103 determines that charger 107 can provide enough power to support both system and battery fast charging, system starts fast charging to a sufficient charge level. By turning on fast charging when needed, microcontroller 102 and/or processor 103 mitigates battery degradation caused by fast charging or it enables fast charging without a more expensive charger by turning down system power.

In some embodiments, microcontroller 102, processor 103, and/or software (SW) records battery State-Of-Charge (SOC) as SOC-1 at the end of battery discharge and/or at the beginning of charge, and/or when a battery charger is attached. In some embodiments, microcontroller 102, processor 103, and/or software (SW) records time (Ti) when battery charging starts (e.g., with AC adapter) and/or when a battery charger is attached. In some embodiments, microcontroller 102, processor 103, and/or SW records time ($T_2$) and SOC (SOC-2) when next battery discharge starts, or AC adapter is detached. SOC-2 may be approximately 100%. In some embodiments, microcontroller 102, processor 103, and/or SW continues to record the information for a certain period set (e.g., 3 days). In some embodiments, while microcontroller 102, processor 103, and/or SW continues to record the information for a certain period set, it calculates the minimum SOC (or minimum SOC pattern, such as 30% on Mondays, 50% on Tuesdays, etc. . . . ) for the time period as SOC-min; calculates the time needed to charge the battery at the reduced charging speed from SOC-1 to SOC-2. In some embodiments, microcontroller 102, processor 103, and/or SW set the time as $T_r$; and compare $T_r$ and ($T_2-T_1$). If $T_r \leq (T_2-T_1)$ for the charge event(s) during the time period, and conclude that reduced charging speed is enough for the charging event. In some embodiments, $T_r$ may be calculated as the time needed to charge the battery from empty to full at the reduced charging speed. Specific reduced charging speed may be set or adaptive reduced charging speed may be set (e.g. 1 C charging on Mondays through Fridays, 0.5 C charging on Saturdays and Sundays). The SOC pattern can also be each day of the week, or a time period. In some embodiments, minimum SOC is calculated to determine minimum charging.

In some embodiments, microcontroller 102, processor 103, and/or SW changes the charging settings to at least one of the following—limited charging and/or reduced charging speed. Limited charging is done to mitigate negative impacts of battery degradation due to full-charging of the battery. Reduced charging speed is done to mitigate negative impacts of battery degradation from fast charging.

In limited charging, microcontroller 102, processor 103, and/or SW suggests (100-SOC-min) % or greater as charge termination percentage. This avoids full charge that degrades the battery the most while ensuring necessary charge. SW may suggest alternative value for charge termination such as charge termination capacity, energy or charge termination voltage. In some embodiments, suggestion may be a sufficient fixed value (e.g. use 80% when (100-SOC-min) is less than 80%.). In some embodiments, SW may suggest greater than 100% charge when SOC-min is 0% and system allows to exceed 100% from a safety standpoint.

In reduced charging speed, microcontroller 102, processor 103, and/or SW suggests reduced charging speed when reduced charging speed is enough by the calculation of the time needed to charge the battery at the reduced charging speed from SOC-1 to SOC-2, and comparison of $T_r$ and ($T_2-T_1$), for the charging event(s) during the time period. Reduced charging speed may be pre-defined or calculated as to complete charging from SOC-1 to SOC-2 within ($T_2-T_1$). In some embodiments, $T_r$ may be the time needed to charge the battery at the fast charging speed either from SOC-1 to SOC-2 or from empty to full. In such a situation, SW may suggest faster charging speed instead of reduced charging speed when $T_r$ is greater than $T_2-T_1$. In some embodiments, microcontroller 102, processor 103, and/or SW may suggest a charger integrated circuit (IC) to change the setting instead of changing it directly. In some embodiments, microcontroller 102, processor 103, and/or SW may notify a user that charging setting is changed. SW or system may request an approval from the user before changing the settings.

In some embodiments, when microcontroller 102 and/or processor 103 detects that fast charging is needed, it may ask for user's permission to start fast charging or turn down system power and start fast battery charging with available power. In some embodiments, when microcontroller 102 and/or processor 103 determines that charger 107 is not powerful enough to support both system and fast charging, system power that is turned down/off for fast charging may be, but is not limited to, display brightness, CPU performance, Wi-Fi, peripheral sensors, etc. For example, charger 107 is not powerful enough to support both system and fast charging may lower display brightness, reduce CPU performance, turn off Wi-Fi, disable peripheral sensors, etc.

In some embodiments, microcontroller 102 and/or processor 103 may cause fast charging to continue until battery 101 becomes full or battery 101 has sufficient charge level for the next situation/schedule. While the embodiments here are illustrated with reference to a mobile device, the embodiments are also applicable to datacenter batteries, backup batteries in offices/homes, batteries in consumer devices and tools, etc. Datacenter may use supplemental power from a backup battery and enables peak power mode for better performance After the peak power event, battery is recharged. When datacenter battery is in a situation where fast charging is needed, system starts fast battery charging to prepare for the next peak power event. In this case, the situation where backup battery may need to be fast charged may be, but is not limited to, future schedule (e.g., peak power schedule), usage model (e.g., frequency of peak power mode), battery charging level (e.g., fast charging may be needed when the previous peak power mode or other events used more energy than estimated), scheduled power outage, weather forecast (e.g. thunderstorm may cause power outage).

In some embodiments, microcontroller 102 and/or processor 103 may consider the time length to the situation, and then calculate the required charge level for the situation. Microcontroller 102 and/or processor 103 may also calculate the charge possible by the time length to the situation. The two calculations are then compared to determine if fast charging is needed. In some embodiments, microcontroller 102 and/or processor 103 may adjust the speed of fast charging to lower than a maximum fast charging speed if available time to the situation is sufficient to charge the battery to the required charge level. By adjusting charging speed from the maximum fast charging speed, microcontroller 102 and/or processor 103 reduces unnecessary system power adjustment and/or battery degradation.

In some embodiments, microcontroller 102 and/or processor 103 detects the triggers that disables limited charging and/or reduced charging speed. For example, microcontroller 102 and/or processor 103 detects: duration and/or pattern of pressing the button (e.g. press power button twice quickly to disable), pattern to open/close the lid (e.g. open and close lid twice to disable), pattern to attach/detach the AC adapter, activating disabling option in software, and/or activating dedicated button/sensor to disable limited charging and/or reduced charging speed.

Figure 2:
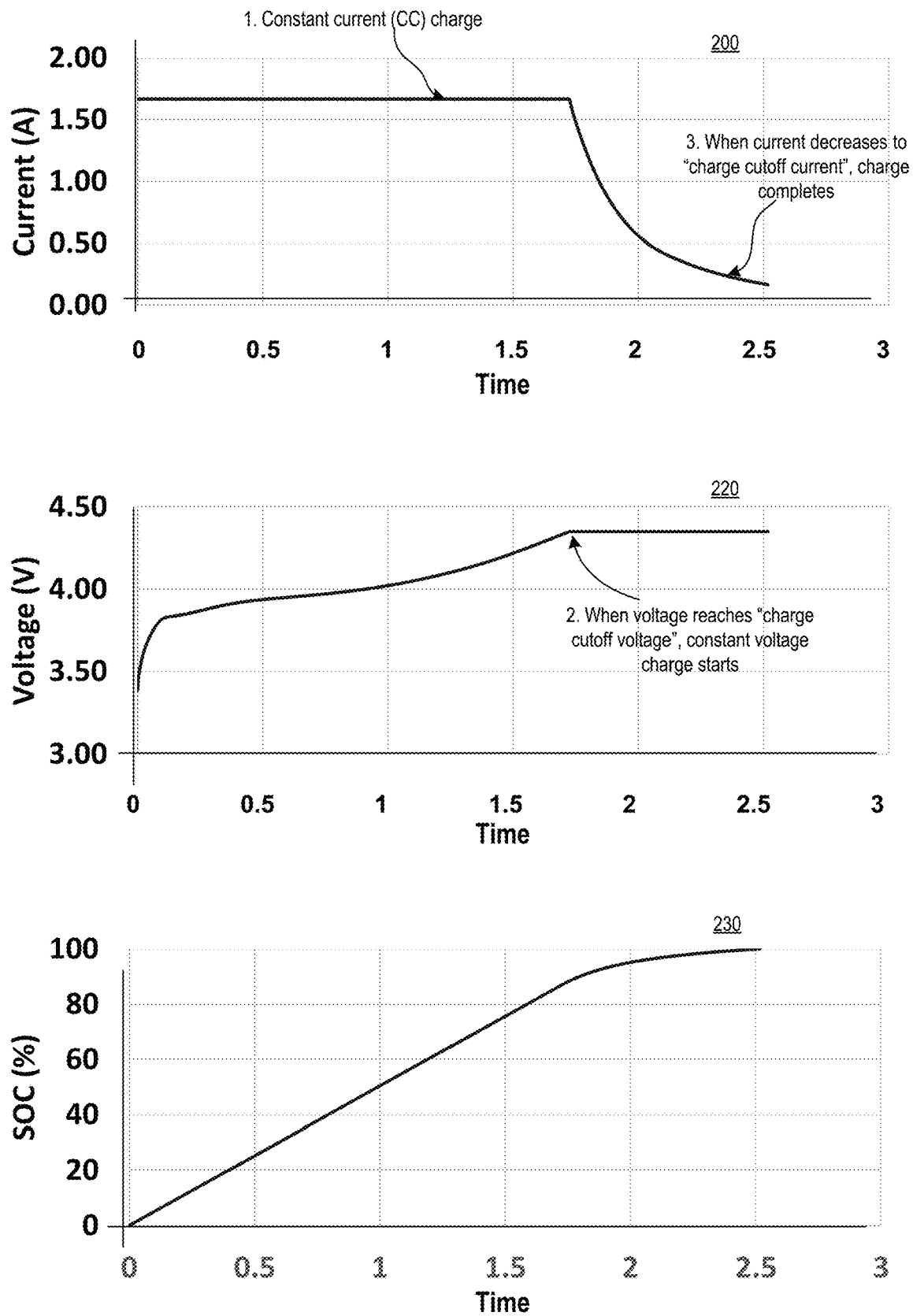
FIG. 2 illustrates a set of plots showing battery charging mechanism that uses constant current followed by constant voltage to charge a battery.

FIG. 2 illustrates a set of plots 200, 220, and 230 showing battery charging mechanism that uses constant current followed by constant voltage to charge a battery. Plot 200 illustrates a current plot where the battery is initially charged using constant current charge (e.g., usually at 0.5 C to 1.0 C depending upon the specification of the battery cell). Plot 220 shows a voltage plot where the battery begins to charge using constant voltage (e.g., 4.2V to 4.4V depending on the specification of the battery cell) when the battery voltage reaches a charge cutoff voltage. At that point, constant current charging is stopped. As shown in plot 200, when current decreases to charge current cutoff (e.g., 0.02 to 0.05 C depending on the specification of the battery cell), charge completes. Plot 230 illustrates the state of charge (SOC) for a 3.3 Ah Li-ion battery as it charges using constant current followed by constant voltage upon charge cutoff voltage, and then stopping the charge upon reaching cut-off current. Numbers in x axis and y axis in FIG. 2 are examples and may change by battery spec, size or other factors.

Figure 3:
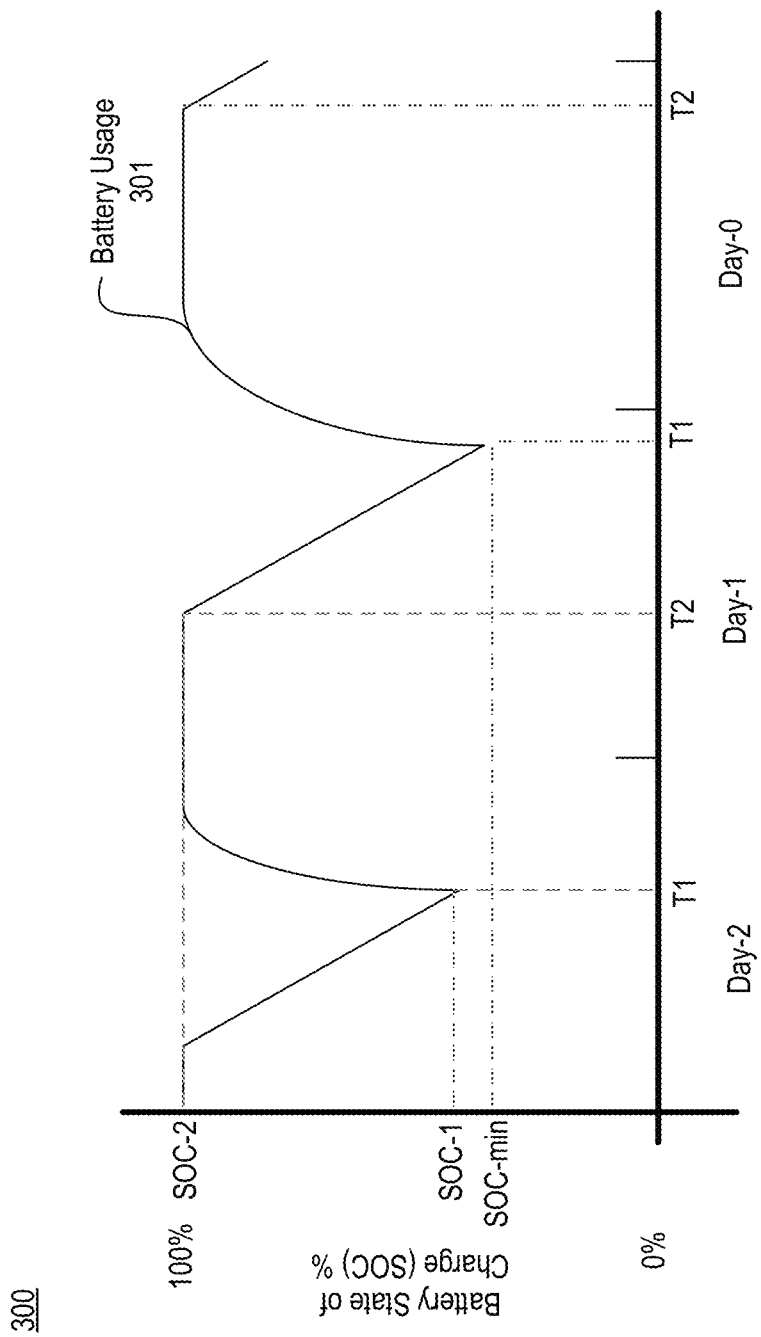
FIG. 3 illustrates a plot showing battery usage and monitoring of events and state-of-charge for context-based battery charging, in accordance with some embodiments.

FIG. 3 illustrates plot 300 showing battery usage and monitoring of events and state-of-charge for context-based battery charging, in accordance with some embodiments. Here, x-axis is time in various days, and y-axis is state of charge (SOC) in percentage. Battery usage 301 toggles between near or 100% SOC and a lower level SOC such as a SOC-1 and SOC-min.

Figure 4:
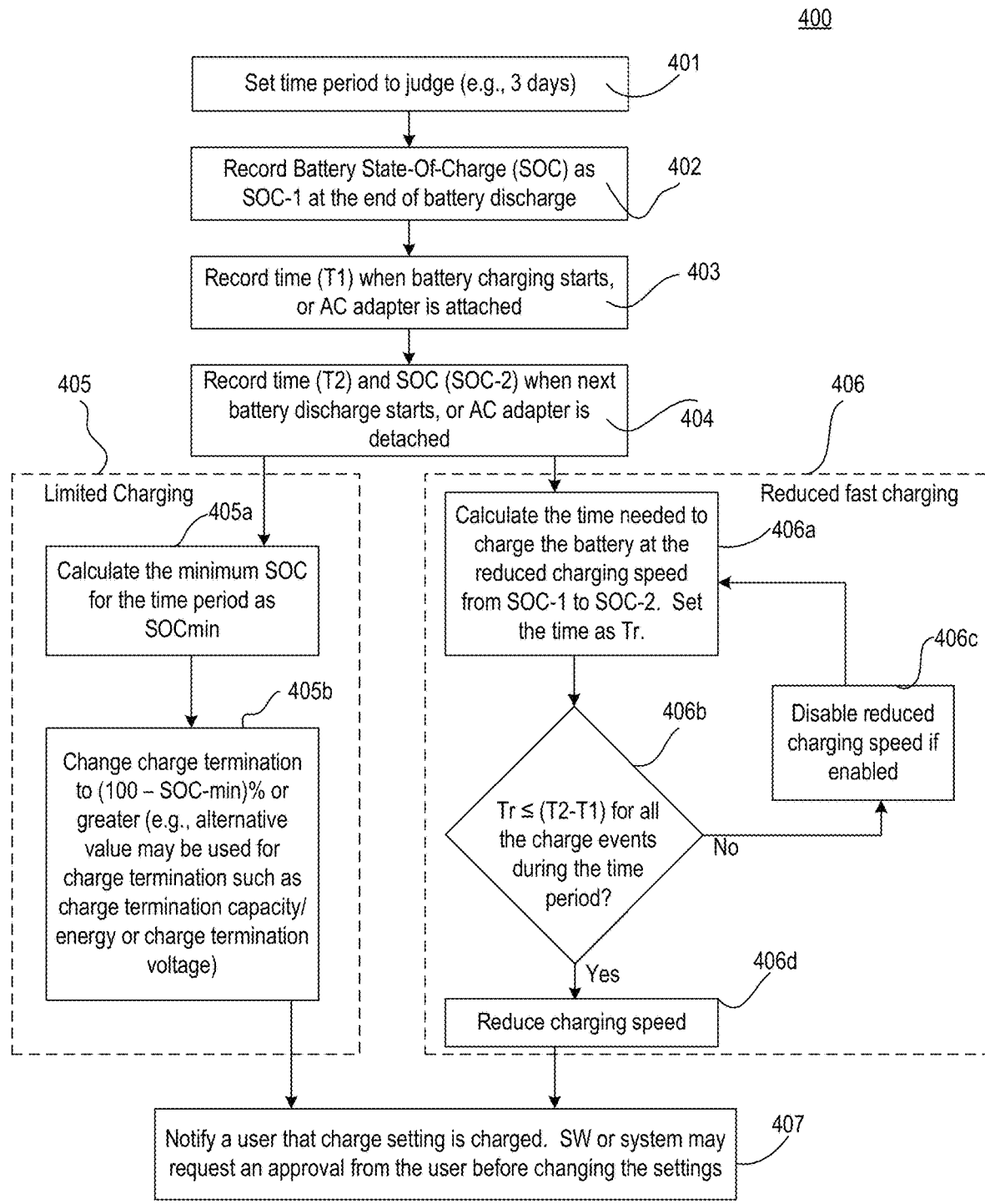
FIG. 4 illustrates a flowchart of a method for context-based battery charging, in accordance with some embodiments.

FIG. 4 illustrates flowchart 400 of a method for context-based battery charging, in accordance with some embodiments. While the blocks are shown in a particular order, the order can be modified. For example, some blocks may be performed in parallel, while some blocks can be performed before others. The various blocks can be performed by software, hardware, or a combination of then.

At block 401, microcontroller 102, processor 103, and/or software (SW) sets a period to judge and determine whether to use limited charging or reduced fast charging. This period can be can period of time such as 3 days.

At block 402, microcontroller 102, processor 103, and/or software (SW) records battery State-Of-Charge (SOC) as SOC-1 at the end of battery discharge. At block 403, microcontroller 102, processor 103, and/or SW records time (Ti) when battery charging starts (e.g., with AC adapter) or when a battery charger such as AC adapter is attached. At block 403, microcontroller 102, processor 103, and/or SW records time ($T_2$) and SOC (SOC-2) when next battery discharge starts, or AC adapter is detached. SOC-2 may be approximately 100%. In some embodiments, microcontroller 102, processor 103, and/or SW continues to record the information for the period set at block 401 (e.g. 3 days).

In various embodiments, microcontroller 102, processor 103, and/or SW performs an analysis at block 405 to determine whether it should pursue limited charging for the battery. In some embodiments, microcontroller 102, processor 103, and/or SW performs an analysis at block 406 to determine whether it should pursue reduced fast charging for the battery. In that context, while microcontroller 102, processor 103, and/or SW continues to record the information for a certain period set at block 401, at block 405a, it calculates the minimum SOC (or minimum SOC pattern, such as 30% on Mondays, 50% on Tuesdays, etc . . . ) for the time period as SOC-min. At block 406a, microcontroller 102, processor 103, and/or SW also calculates the time needed to charge the battery at the reduced charging speed from SOC-1 to SOC-2. Microcontroller 102, processor 103, and/or SW sets the time as $T_r$, and then at block 406b compares $T_r$ with ($T_2-T_1$). If $T_r$ greater than ($T_2-T_1$) for the charge event(s) during the time period, then at block 406c microcontroller 102, processor 103, and/or SW disables reduced charging speed if it is enabled. The process then proceeds to 406a. If $T_r \leq (T_2-T_1)$ for the charge event(s) during the time period, then at block 406d microcontroller 102, processor 103, and/or SW concludes that reduced charging speed is enough for the charging event. Specific reduced charging speed may be set or adaptive reduced charging speed may be set (e.g. 1 C charging on Mondays through Fridays, 0.5 C charging on Saturdays and Sundays).

In some embodiments, microcontroller 102, processor 103, and/or SW changes the charging settings to at least one of the following-limited charging and/or reduced charging speed. In limited charging, microcontroller 102, processor 103, and/or SW suggests (100-SOC-min) % or greater as charge termination percentage as indicated by block 405b. This avoids full charge that degrades the battery the most while ensuring necessary charge. In some embodiments, microcontroller 102, processor 103, and/or SW may suggest alternative value for charge termination such as charge termination capacity/energy or charge termination voltage. In some embodiments, suggestion may be a sufficient fixed value (e.g., use 80% when (100-SOC-min) is <80%.). In reduced charging speed, microcontroller 102, processor 103, and/or SW suggests reduced charging speed when reduced charging speed is enough by the calculation of the time needed to charge the battery at the reduced charging speed from SOC-1 to SOC-2, and comparison of $T_r$ and $(T_2-T_1)$, for the charging event(s) during the time period.

Reduced charging speed may be pre-defined or calculated so as to complete charging from SOC-1 to SOC-2 within $(T_2-T_1)$. In some embodiments, microcontroller 102, processor 103, and/or SW may suggest a charger integrated circuit (IC) to change the setting instead of changing it directly. In some embodiments, microcontroller 102, processor 103, and/or SW may notify a user that charging setting is changed as indicated by block 407. SW or system may request an approval from the user before changing the settings. In various embodiments, calculation for limited charging uses SOC-1, or both SOC-1 and SOC-2 while reduced charging uses SOC-1, SOC-2, $T_1$ and $T_2$.

In some embodiments, when battery SOC is below a threshold (e.g., 20%), limited charge may be disabled. In some embodiments, light duration, light pattern, and/or light color may be used to indicate that limited charging and/or reduced charging speed is enabled or disabled. In some embodiments, machine-learning (ML) may be used to determine or predict charge limit and/or reduced charging speed. For example, Long Short-Term Memory (LSTM) Recurrent Neural Network may be used to predict required charge limit and/or charging speed by using past data as input. Past data may include past necessary charge, necessary charging speed, duration with or without a battery charger, day of the week, time stamp, etc. Other machine-learning models may also be used. In some embodiments, information of "powercfg-batteryreport" in a command line may be used to determine charge limit and/or charging speed. In some embodiments, the scheme described herein may reside in a firmware in a battery pack, charger IC, charger, AC adapter, outlet, IC that controls power delivery, and/or in a memory space of microcontroller unit. In some embodiments, the scheme described herein may reside in a remote location and control the system over the network. The scheme described herein is applicable to batteries in different industries such as datacenter, cars with batteries, internet-of-things (IOT), robots, etc.

In some embodiments, charging settings may be adjusted from the prediction. For example, if the prediction of charge limit for the next 3 days is 80%, 90% and 70%, charging parameter may be set to 90% which is a maximum value of the prediction period. In some embodiments, the charging parameter may be an average of prediction. In some embodiments, predicted duration with an AC adapter may be considered for the adjustment of the charging setting or parameter. In some embodiments, the charging parameter may be adjusted by an accuracy or error of train, validation and/or test set. For example, if the accuracy of prediction is below a threshold, charging parameter change may not happen or a conservative number may be used instead (e.g. less limited charging, less reduced charging speed).

In some embodiment, for reduced charging speed prediction, duration with AC adapter may be used. Such duration may be a cumulative value from charge start time until a next battery usage. To calculate cumulative value, small duration with battery may be ignored (e.g. less than 5-minute battery usage). In some embodiments, reduced charging speed judgement may depend on whether cumulative duration with AC adapter is less than a threshold. For example, if the threshold is 2.5 hours, which is charging time from battery empty to full at reduced charging speed, reduced charging speed may be implemented when cumulative duration with AC adapter is greater than 2.5 hours. Such judgement may be regardless of battery charge percentage. In some embodiments, training of the model and/or prediction may be performed when a Central Processing Unit (CPU) or graphics process unit (GPU) usage is low, or when a system runs with an AC adapter. This is to avoid machine-learning from taking computational resources or battery energy.

In some embodiments, after charging parameter is changed, input data for prediction may be modified as if charging parameter is not changed. For example, if the original charging percentage is 100% but the scheme described herein changes it to 80%, then the input data to the model for future prediction is 100% when actual charge percentage is 80%. In some embodiments, prediction may be clipped with upper and lower limits. For example, 50% lower limit and 100% upper limit may be used for charge level prediction. In this case, if the prediction is 49%, 50% is used instead. In another example, if the prediction is 101%, 100% is used instead.

In some embodiments, input data for machine-learning training or prediction may be parsed to get data from timestamp such as days of week, hours, morning, afternoon, evening, night, holidays, weekday, weekend, season, etc. In some embodiments, for training, validation, or testing of the model, negative error may be calculated and used instead of standard error such as root mean square error. Negative error is the error which gives negative impact on users such as predicting less charge percentage when a user needs more and/or predicting slow charging when a user needs fast charging.

In some embodiments, implementation of various features of the prediction scheme may be disabled when user's usage pattern change is detected. In some embodiments, when user replaces a notebook PC with new one, past usage data or model parameters for prediction may be transferred to the new one. In some embodiments, the input data may include system and/or battery temperature history, CPU and/or GPU usage history and battery usage history. For example, when the CPU and/or GPU usage is high with AC adapter and battery charge level is high (e.g. greater than 90%) for a long period, heat from the CPU and/or GPU may heat up battery, which accelerates battery degradation or swelling. To avoid that, battery charge level may be lowered when high battery temperature is predicted.

Figure 5:
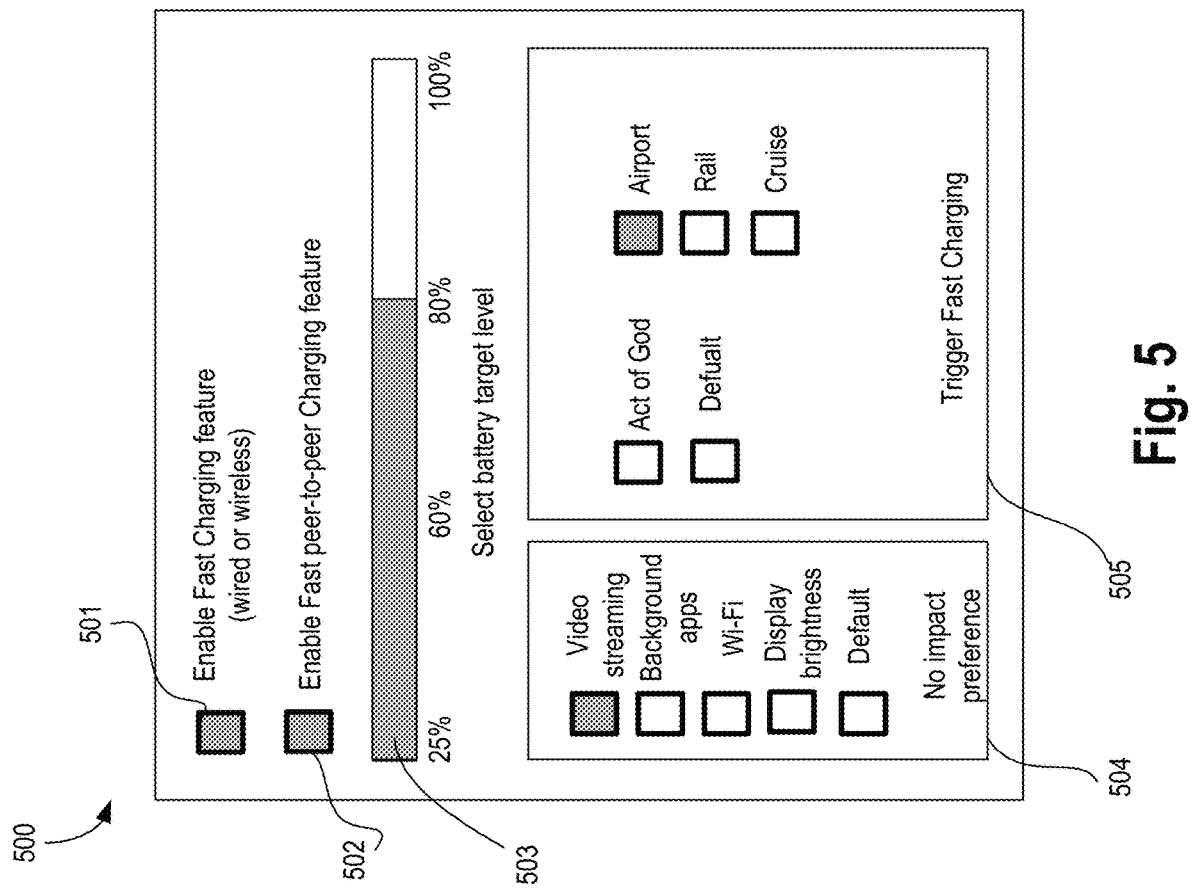
FIG. 5 illustrates a graphical user interface (GUI) for context-based battery charging, in accordance with some embodiments.

FIG. 5 illustrates graphical user interface (GUI) 500 for context-based battery charging, in accordance with some embodiments. GUI 300 may be part of an application that is installed by an original equipment manufacturer (OEM), downloadable application, and/or part of an operating system. The application provides a user access to many parameters to set for fast charging. These parameters can be enabled or disabled. Radio button is used to enable or disable fast charging feature. In this example, the radio button 501 is enabled. While context-based battery charging is described with reference to charge cable 106 and charger 107, it can also be performed via wireless means such as a wireless mat or inductive coupling.

Radio button 502 is used to enable or disable fast peer-to-peer charging feature. For example, a user of a device may charge battery 101 using charge from another nearby device which also has fast peer-to-peer charging enabled. In some embodiments, context-based battery charging can be implemented by charge from charger 107 and peer-to-peer charging when charger 107 and/or peer-to-peer charging alone are not enough to fast charge and support system perform. Charge level bar 503 indicates the desired charge level for charging. In this example, the desired level is set to 80%.

Selection menu 504 lists a number of choices that a user can select as preference. In this example, video streaming is selected which means that the user allows microcontroller 102 and/or processor 103 to modify (e.g., pause or kill) background applications, turn off Wi-Fi, dim down brightness of display 104, and other actions while keeping video streaming uninterrupted. In some embodiments, a default option is available with preselected options based on user habits derived via machine-learning.

Selection menu 505 lists a number of choices that a user can select as preference. In this example, airport is selected which means that the user allows microcontroller 102 and/or processor 103 to fast charge at any airport. Other selections available in this example are Rail, Cruise, or Act of God. This list is a non-exhaustive list, and additional conditions can be added or removed. In some embodiments, a default option is available with preselected options based on user habits derived via machine-learning.

In some embodiments, microcontroller 102 and/or processor 103 may consider one or more of user's preferred parameters inferred from any previous manual selections and/or machine-learning from user's behavior and/or precedent, and adjusts non-preferred parameters to allocate more charging power. In some embodiments, microcontroller 102 and/or processor 103 may consider user permission to execute, one or more applications, as inferred by machine-learning to determine user's preferred parameters. Non-preferred parameters depend on the current usage of the device. For example, if the user is watching a movie on Netflix, dimming the screen would be a non-preferred parameter, and other power saving techniques such as halting background applications may be used. Consideration of such parameters may happen automatically. For example, consideration of the preferred parameters may happen without prompting the user to avoid unnecessary disruption to the user.

In some embodiments, microcontroller 102 and/or processor 103 detects the triggers that disables limited charging and/or reduced charging speed. For example, microcontroller 102 and/or processor 103 detects: duration and/or pattern of pressing the button (e.g. press power button twice quickly to disable); pattern to open/close the lid (e.g. open and close lid twice to disable); pattern to attach/detach the AC adapter; activating disabling option in software; and/or activating dedicated button/sensor to disable limited charging and/or reduced charging speed.

Elements of embodiments are also provided as a machine-readable medium (e.g., memory) for storing the computer-executable instructions (e.g., instructions to implement any other processes discussed herein). In some embodiments, a computing platform comprises a memory, a processor, a machine-readable storage media (also referred to as tangible machine readable medium), a communication interface (e.g., wireless or wired interface), and a network bus coupling them.

In some embodiments, the processor is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks of the system are coupled together via the network bus. Any suitable protocol may be used to implement the network bus.

In some embodiments, the machine-readable storage medium includes instructions (also referred to as the program software code/instructions) for intelligent prediction of processor idle time as described with reference to the various embodiments and flowchart.

Program software code/instructions associated with flowchart 400 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 400 (and/or various embodiments) are executed by the computer system.

In some embodiments, the program software code/instructions associated with flowchart 400 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with flowchart 400 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, magnetic random-access memory, ferroelectric memory, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, the tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Android®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 6:
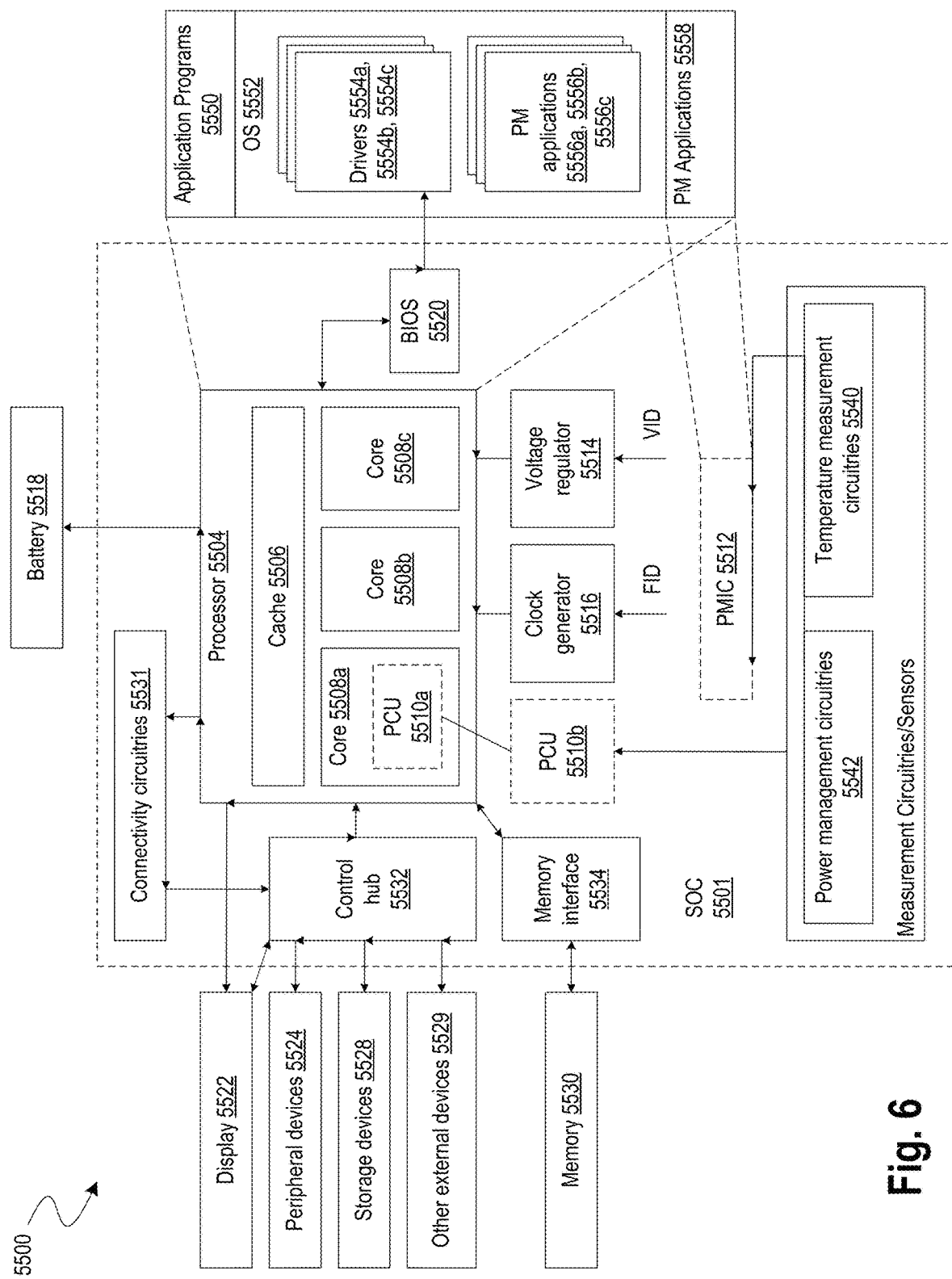
FIG. 6 illustrates a smart device or a computer system or a SoC (System-on-Chip) with hardware and/or software for context-based battery charging, in accordance with some embodiments.

FIG. 6 illustrates a smart device or a computer system or a SoC (System-on-Chip) with hardware and/or software for context-based battery charging, in accordance with some embodiments. It is pointed out that those elements of FIG. 6 having the same reference numbers (or names) as the elements of any other figure may operate or function in any manner similar to that described, but are not limited to such. Any block in this smart device can have the apparatus for dynamically optimizing battery charging voltage.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 6, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 6, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device

5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax or LTE equivalent), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes—energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510a. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510b.

In some embodiments, pCode executing on PCU 5510a/b has a capability to enable extra compute and telemetries resources for the runtime support of the pCode. Here pCode refers to a firmware executed by PCU 5510a/b to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc, th) based on the available battery power (which changes slowly) and set the SoC throttling peak power (Psoc, th). In some embodiments, pCode decides the frequencies and voltages based on Psoc, th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554a, 5554b, 5554c). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top." "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TI-BT device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor may also be a dielet or chiplet.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here, the term "interconnect" refers to a communication link, or channel, between two or more points or nodes. It may comprise one or more separate conduction paths such as wires, vias, waveguides, passive components, and/or active components. It may also comprise a fabric. In some embodiments, a p-unit is coupled to an OS via an interface.

Here the term "interface" generally refers to software and/or hardware used to communicate with an interconnect. An interface may include logic and I/O driver/receiver to send and receive data over the interconnect or one or more wires.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Following examples are provided that illustrate the various embodiments. The examples can be combined with other examples. As such, various embodiments can be combined with other embodiments without changing the scope of the invention.

Example 1: A machine-readable storage media having machine-executable instructions that when executed, cause one or more processors to perform a method comprising: recording a first battery state-of-charge at an end of a first battery discharge and/or at a beginning of a first battery charge after the first battery discharge or when a battery charger is attached; recording a first time when battery charging starts or when the battery charger is attached; recording a second time when a second battery discharge starts or a battery charger is detached; recording a second battery state-of-charge when a second battery discharge starts or a battery charger is detached; calculating, at least one of, a minimum state-of-charge, a charging speed, or time with a battery charger based on at least one of the first state-of-charge and second state-of-charge or a difference between the first time and second time; and modifying charging settings to limited charging or reduced charging speed based on one or both of the minimum state-of-charge or difference between the first time and second time.

Example 2: The machine-readable storage media of example 1 having machine-executable instructions that when executed, cause one or more processors to perform the method comprising: disabling the limited charging when the first state-of-charge or second state-of-charge is below a threshold.

Example 3: The machine-readable storage media of example 1, wherein limited charging or reduced charging speed is enabled or disabled by one of, some of, or all of: duration and/or pattern of pressing a button, pattern to open or close a lid, pattern to attach or detach a charger, activation of disabling option in software, or activation of dedicated button or sensor.

Example 4: The machine-readable storage media of example 1, wherein limited charging or reduced charging speed is enabled or disabled as indicated by a light duration, light pattern, or light color.

Example 5: The machine-readable storage media of example 1 having machine-executable instructions that when executed, cause one or more processors to perform the method comprising: applying a machine-learning scheme to determine limits for limited charging and/or reduced charging speed.

Example 6: The machine-readable storage media of example 5, wherein the limited charging and/or reduced charging speed is adjusted by machine-learning error.

Example 7: The machine-readable storage media of example 5, wherein the limited charging and/or reduced charging speed is adjusted by temperature of system and/or a battery.

Example 8: The machine-readable storage media of example 5, wherein the machine-learning scheme includes neural network to predict limits one or both of for limited charging or reduced charging speed.

Example 9: A machine-readable storage media having machine-executable instructions that when executed, cause one or more processors to perform a method comprising: recording a first battery state-of-charge at an end of a first battery discharge and/or at a beginning of a first battery charge after the first battery discharge and/or when a battery charger is attached; recording a second battery state-of-charge when a second battery discharge starts or a battery charger is detached; and modifying charging settings to limited charging based on the first and/or second battery state-of-charge.

Example 10: The machine-readable storage media of example 9 having machine-executable instructions that when executed, cause one or more processors to perform the method comprising: calculating a minimum state-of-charge and/or a charging speed based on the first and/or second state-of-charges.

Example 11: The machine-readable storage media of example 10 having machine-executable instructions that when executed, cause one or more processors to perform the method comprising: modifying a percentage of charge termination to at least 100 minus the minimum state-of-charge.

Example 12: The machine-readable storage media of example 9 having machine-executable instructions that when executed, cause one or more processors to perform a method comprising: recording a first time when one of both of battery charging starts or a battery charger is attached; recording a second time when a second battery discharge starts or a battery charger is detached; and modifying charging settings of charging speed based on at least one of a difference between the first time and second time, the first battery state-of-charge, and/or the second battery state-of-charge.

Example 13: A system comprising: a display; a battery to power the display, the battery including a microcontroller; a processor circuitry to execute one or more instructions, the processor circuitry powered by the battery; and an interface to connect a charge cable to provide power to the system, wherein the processor circuitry or the microcontroller is to: record a first battery state-of-charge at an end of a first battery discharge and/or at a beginning of a first battery charge after the first battery discharge or when a battery charger is attached; record a first time when battery charging starts or when the battery charger is attached; record a second time when a second battery discharge starts or a battery charger is detached; record a second battery state-of-charge when a second battery discharge starts or a battery charger is detached; calculate, at least one of, a minimum state-of-charge, a charging speed, or time with a battery charger based on at least one of the first state-of-charge and second state-of-charge or a difference between the first time and second time; and modify charging settings to limited charging or reduced charging speed based on one or both of the minimum state-of-charge or difference between the first time and second time.

Example 14: The system of example 13, wherein the processor circuitry or the microcontroller is to: disable the limited charging when the first state-of-charge or second state-of-charge is below a threshold.

Example 15: The system of example 13, wherein limited charging and/or reduced charging speed is enabled or disabled by duration and/or pattern of pressing a button, pattern to open/close a lid, pattern to attach/detach a charger, activation of disabling option in software, and/or activation of dedicated button or sensor.

Example 16: The system of example 13, wherein limited charging and/or reduced charging speed is enabled or disabled as indicated by a light duration, light pattern, and/or light color.

Example 17: The system of example 13, wherein the processor circuitry or the microcontroller is to: apply a machine-learning scheme to determine limits for limited charging and/or reduced charging speed.

Example 18: The system of example 17, wherein the machine-learning scheme includes neural network to predict limits for limited charging and/or reduced charging speed.

Example 19: The system of example 17, wherein the machine-learning scheme includes models with limited train size and larger than limited train size, wherein the processor circuitry or the microcontroller is to train the models separately and periodically at a same time.

Example 20: The system of example 19, wherein the processor circuitry or the microcontroller is to select a model from among the models that results in prediction of limited charging and/or reduced charging speed with a least error.

Example 21: The system of example 17, wherein the processor circuitry or the microcontroller is to apply Support Vector Machine (SVM) and/or Random Forest to predict unnecessary fast charging.

Example 22: The system of example 13, wherein the battery comprises Li-ion battery, and wherein the battery is rechargeable.

Example 23: A system comprising: a display; a battery to power the display, the battery including a microcontroller; a processor circuitry to execute one or more instructions, the processor circuitry powered by the battery; and an interface to connect a charge cable to provide power to the system, wherein the processor circuitry or the microcontroller is to: record a first battery state-of-charge at an end of a first battery discharge and/or at a beginning of a first battery charge after the first battery discharge and/or when a battery charger is attached; record a second battery state-of-charge when a second battery discharge starts or a battery charger is detached; and modify charging settings to limited charging based on the first and/or second battery state-of-charge.

Example 24: The system of example 23, wherein the processor circuitry or the microcontroller is to: calculate a minimum state-of-charge and/or a charging speed based on the first and/or second state-of-charges.

Example 25: The system of example 24, wherein the processor circuitry or the microcontroller is to: modify a percentage of charge termination to at least 100 minus the minimum state-of-charge.

Example 26: The system of example 23 wherein the processor circuitry or the microcontroller is to: record a first time when battery charging starts and/or a battery charger is attached; record a second time when a second battery discharge starts or a battery charger is detached; and modify charging settings of charging speed based on at least one of a difference between the first time and second time, the first battery state-of-charge, and/or the second battery state-of-charge.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory machine-readable storage media having machine-executable instructions that when executed, cause one or more processors at a computing device to:
   record a first battery state-of-charge at an end of a first battery discharge and/or at a beginning of a first battery charge after the first battery discharge or when a battery charger is attached;
   record a first time when battery charging starts or when the battery charger is attached;
   record a second time when a second battery discharge starts or a battery charger is detached;
   record a second battery state-of-charge when a second battery discharge starts or a battery charger is detached;
   calculate at least one of a minimum state-of-charge, a charging speed, or a charging time with a battery charger based on at least one of the first state-of-charge and second state-of-charge or a difference between the first time and second time; and
   communicate from the computing device to the battery charger to suggest modifying charging settings at the battery charger to limited charging or reduced charging speed based on one or more of the minimum state-of-charge or the difference between the first time and second time.

2. The non-transitory machine-readable storage media of claim 1 having machine-executable instructions that when executed, cause the one or more processors to:
   disable the limited charging when the first state-of-charge or second state-of-charge is below a threshold.

3. The non-transitory machine-readable storage media of claim 1, wherein the limited charging or the reduced charging speed is enabled or disabled by one of, some of, or all of: duration and/or pattern of pressing a button, a pattern to open or close a lid, a pattern to attach or detach a charger, activation of disabling option in software, or activation of a dedicated button or sensor.

4. The non-transitory machine-readable storage media of claim 1, wherein the limited charging or the reduced charging speed is enabled or disabled as indicated by a light duration, a light pattern, or a light color.

5. The non-transitory machine-readable storage media of claim 1 having machine-executable instructions that when executed, cause the one or more processors to:
   apply a machine-learning scheme to determine limits for the limited charging and/or the reduced charging speed.

6. The non-transitory machine-readable storage media of claim 5, wherein the limited charging and/or the reduced charging speed is adjusted by a machine-learning error.

7. The non-transitory machine-readable storage media of claim 5, wherein the limited charging and/or the reduced charging speed is adjusted by a temperature of system and/or a battery.

8. The non-transitory machine-readable storage media of claim 5, wherein the machine-learning scheme includes a neural network to predict limits on one or more of the limited charging or the reduced charging speed.

9. A non-transitory machine-readable storage media having machine-executable instructions that when executed, cause one or more processors to:
   access a fuel gauge of a microcontroller of a battery to obtain a first battery state-of-charge of the battery at an end of a first battery discharge and/or at a beginning of a first battery charge after the first battery discharge and/or when a battery charger is attached, and to obtain a second battery state-of-charge of the battery when a second battery discharge starts or the battery charger is detached;
   modify charging settings to limited charging based on the first and/or second battery state-of-charge;
   record a first time when one or both of battery charging starts or the battery charger is attached;
   record a second time when a second battery discharge starts or the battery charger is detached; and
   modify charging settings of charging speed based on at least one of a difference between the first time and second time, the first battery state-of-charge, and/or the second battery state-of-charge.

10. The non-transitory machine-readable storage media of claim 9, wherein to modify the charge settings, the one or more processors are to communicate from the one or more processors to the battery charger to suggest the modifying of the charging settings at the battery charger.

11. The non-transitory machine-readable storage media of claim 9 having machine-executable instructions that when executed, cause the one or more processors to:
   calculate a minimum state-of-charge and/or a charging speed based on the first and/or second state-of-charges.

12. The non-transitory machine-readable storage media of claim 11 having machine-executable instructions that when executed, cause the one or more processors to:
   modify a percentage of charge termination to at least 100 minus the minimum state-of-charge.

13. A system, comprising:
   a display;
   a battery to power the display, the battery including a microcontroller;
   a processor circuitry to execute one or more instructions, the processor circuitry powered by the battery; and
   an interface to connect a charge cable to a battery charger which is to provide power to the system, wherein the processor circuitry or the microcontroller is to:
      record a first battery state-of-charge at an end of a first battery discharge and/or at a beginning of a first battery charge after the first battery discharge or when the battery charger is attached;
      record a first time when battery charging starts or when the battery charger is attached;

record a second time when a second battery discharge starts or the battery charger is detached;

record a second battery state-of-charge when a second battery discharge starts or the battery charger is detached;

calculate at least one of, a minimum state-of-charge, a charging speed, or a charging time with the battery charger based on at least one of the first state-of-charge and second state-of-charge or a difference between the first time and second time; and communicate to the battery charger via the interface to suggest modifying charging settings at the battery charger to limited charging or reduced charging speed based on one or more of the minimum state-of-charge or the difference between the first time and second time.

14. The system of claim 13, wherein the processor circuitry or the microcontroller is to:
disable the limited charging when the first state-of-charge or second state-of-charge is below a threshold.

15. The system of claim 13, wherein the limited charging and/or the reduced charging speed is enabled or disabled by duration and/or a pattern of pressing a button, a pattern to open/close a lid, a pattern to attach or detach a charger, activation of a disabling option in software, and/or activation of a dedicated button or sensor.

16. The system of claim 13, wherein the limited charging and/or the reduced charging speed is enabled or disabled as indicated by a light duration, a light pattern, and/or a light color.

17. The system of claim 13, wherein the processor circuitry or the microcontroller is to:
apply a machine-learning scheme to determine limits for the limited charging and/or reduced charging speed.

18. The system of claim 17, wherein the machine-learning scheme includes a neural network to predict limits for the limited charging and/or the reduced charging speed.

19. The system of claim 17, wherein the machine-learning scheme includes models with limited train size and larger than limited train size, wherein the processor circuitry or the microcontroller is to train the models separately or at a same time.

20. The system of claim 19, wherein the processor circuitry or the microcontroller is to select a model from among the models that results in prediction of the limited charging and/or the reduced charging speed with a least error.

* * * * *

UNITED STATES PATENT AND TRADEMARK OFFICE
CERTIFICATE OF CORRECTION

PATENT NO. : 12,199,461 B2
APPLICATION NO. : 17/338488
DATED : January 14, 2025
INVENTOR(S) : Naoki Matsumura et al.

It is certified that error appears in the above-identified patent and that said Letters Patent is hereby corrected as shown below:

In the Specification

Column 34
Line 11 "... a temperature of system and/or" should read --... a temperature of a system and/or--

Column 35
Line 6 "calculate at least one of, a minimum..." should read --calculate at least one of a minimum...--

Signed and Sealed this
Eighteenth Day of February, 2025

Coke Morgan Stewart
*Acting Director of the United States Patent and Trademark Office*